United States Patent [19]

Kawase et al.

[11] Patent Number: 5,089,312
[45] Date of Patent: Feb. 18, 1992

[54] CERAMIC-METAL JOINED COMPOSITE BODIES WITH A CURVED BOTTOM METAL RECESS

[75] Inventors: Hiroyuki Kawase; Koji Kato, both of Nagoya, Japan

[73] Assignee: NGK Insulators, Ltd., Japan

[21] Appl. No.: 422,903

[22] Filed: Oct. 18, 1989

[30] Foreign Application Priority Data

Oct. 18, 1988 [JP] Japan .............................. 63-135003

[51] Int. Cl.⁵ ............................................. F01D 5/28
[52] U.S. Cl. .................................... 428/139; 428/131; 428/133; 428/137; 428/138; 428/156; 428/162; 428/161; 428/472; 428/698; 428/689; 428/220; 403/30; 403/273; 403/361; 416/241 B; 416/244 A
[58] Field of Search ............... 428/131, 133, 137, 138, 428/139, 156, 162, 161, 472, 698, 689, 220; 403/30, 273, 361; 416/241 B, 244 A

[56] References Cited

U.S. PATENT DOCUMENTS

| | | | |
|---|---|---|---|
| 2,602,683 | 7/1952 | Aue | 403/259 |
| 2,874,932 | 2/1959 | Sorensen | 416/241 B X |
| 3,970,158 | 7/1976 | Black et al. | 403/361 X |
| 4,417,854 | 11/1983 | Cain et al. | 416/241 B |
| 4,639,194 | 1/1987 | Bell, III et al. | 416/244 A X |
| 4,643,648 | 2/1987 | Hüller | 416/241 B |
| 4,690,617 | 9/1987 | Oda et al. | 416/241 B |
| 4,747,722 | 5/1988 | Kawaguchi et al. | 403/361 X |
| 4,810,585 | 3/1989 | Oda et al. | 428/472 X |
| 4,886,695 | 12/1989 | Mizuno et al. | 428/138 X |

FOREIGN PATENT DOCUMENTS

| | | |
|---|---|---|
| 139406 | 5/1985 | European Pat. Off. . |
| 161081 | 11/1985 | European Pat. Off. . |
| 2734747 | 2/1979 | Fed. Rep. of Germany ...... 403/273 |
| 58-223675 | 12/1983 | Japan . |

*Primary Examiner*—Ellis P. Robinson
*Assistant Examiner*—William P. Watkins, III
*Attorney, Agent, or Firm*—Parkhurst, Wendel & Rossi

[57] ABSTRACT

A ceramic-metal joined composite body including a ceramic member having a projection formed thereon, and a metallic member having a recess formed therein. The projection of the ceramic member is fitted into the recess of the metallic member, and a corner of a bottom of the recess has a rounded dimension such that $R/D \geq 0.04$, in which R and D are the rounded dimension of the corner of the bottom of the recess and an outer diameter of the projection, respectively. The ceramic-metal joined composite body particularly is useful in a rotary shaft for a turbocharger rotor or a gas turbine rotor.

6 Claims, 2 Drawing Sheets

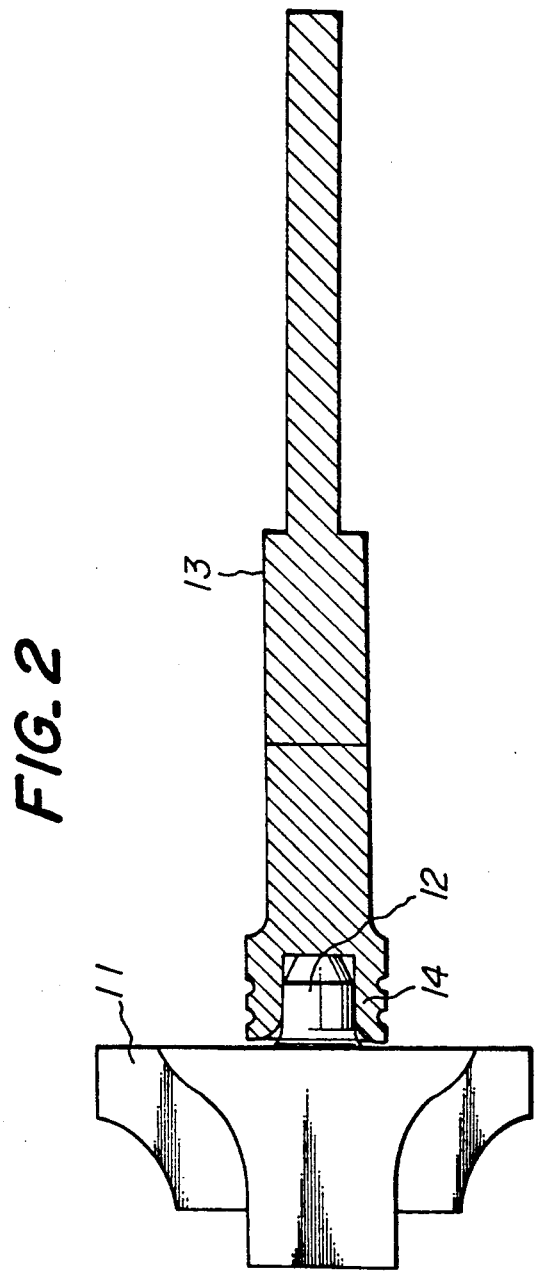

CERAMIC-METAL JOINED COMPOSITE BODIES WITH A CURVED BOTTOM METAL RECESS

BACKGROUND OF THE INVENTION (1) Field of the Invention

The present invention relates to ceramic-metal joined composite bodies.

(2) Related Art Statement

As illustrated in Japanese patent application Laid-open Nos. 58-223,675 and 61-226,501, conventional ceramic-metal joined composite bodies are each constituted by providing a projection on a ceramic member, and fixing the projection to a recess formed in a metallic member through press shrinkage, or expansion fitting, or brazing.

In many of the bodies, a corner of a bottom of the recess of the metallic member is shaped substantially at a right angle or tapered. Further, even when the bottom corner is rounded, no significance has been attributed to its shape.

However, since conspicuous stress concentration occurs at the bottom corner of the recess of the metallic member due to fitted forces in the case of the conventional ceramic-metal joined composite bodies, cracks occur at the corner of the recess bottom of the metallic member owing to bending fatigue under rotation, which sometimes leads to fracture of the joined composite bodies. Thus, the conventional joined composite bodies having high reliability could not be obtained.

SUMMARY OF THE INVENTION

It is an object of the present invention to solve the above-mentioned problems, and to provide ceramic-metal joined composite bodies having high reliability, which can easily be produced.

The present invention relates to ceramic-metal joined composite bodies in which a projection provided on a ceramic member is joined to a recess provided in a metallic member by fitting, the recess having a rounded corner of a bottom, wherein $R/D \geq 0.04$ in which D and R are the outer diameter of the projection and the rounded dimension of the corner of the bottom of the recess, respectively.

The upper limit of R/D is 0.5 from the designing standpoint of view. That is, in this case, the bottom of the recess has a semicircle section.

In the above, the rounded dimension is intended to mean both that the axial section of the corner of the bottom of the metallic member exhibits an arc having a given radius of curvature and that it involves all shapes exhibiting not a complete arch but shapes substantially approximate thereto.

In the above-mentioned construction, the stress concentration occurring at the corner of the bottom of the recess of the metallic member is reduced by setting the rounded dimension R of the bottom corner of the recess at not less than 0.04 times the outer diameter D of the projection of the ceramic member. Consequently, the bending fatigue resistance under rotation of the joined composite body can be enhanced to effectively prevent the fracture of the joined composite body. Since only a poor effect can be obtained when R of the bottom corner of the recess falls in $R/D < 0.04$, R/D needs to be not less than 0.04.

The upper limit of R/D is 0.5. If R/D exceeds 0.5, the cross section of the recess at the central portion of the bottom forms an acute angle. Thus, stress is concentrated upon this central portion of the bottom of the recess, and breaks the metallic member.

These and other objects, features, and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIGS. 1(A) and (B) and FIG. 2 are partially sectional views of ceramic-metal joined composite bodies according to the present invention.

DETAILED DESCRIPTION OF THE INVENTION

Figure 1A:
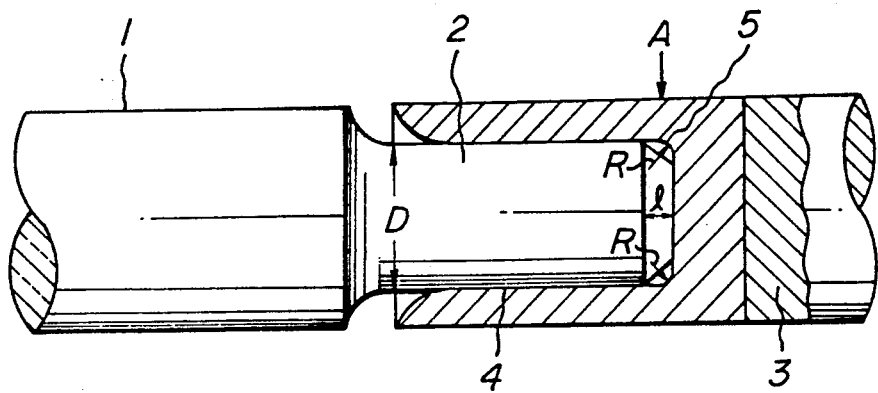

FIG. 1(A) is a diagrammatical view illustrating an embodiment of the ceramic-metal joined composite body according to the present invention. In this embodiment, a projection 2 is provided on a ceramic member 1, and the projection 2 is fitted into a recess 4 of a metallic member 3. As shown in FIG. 1(A), the recess 4 may be formed in an intermediate member which is joined to an end of the metallic member 3. The projection has a frusto-conical end portion. As a fitting method, conventionally known press fitting, shrinkage fitting, expansion fitting or a combination thereof can favorably be used. As shown in FIG. 1(A), the shape of the corner 5 of the bottom of the recess 4 is rounded or preferably the radius of curvature, R, being not less than 0.04 times but not more than 0.5 times the outer diameter D of the projection. Although any ceramic material and any metallic material may be used, silicon nitride, silicon carbide, and Si-Al-O-N are preferred as the ceramic materials, and precipitation hardenable alloys such as Incoloy (tradename) (Ni-Fe-Co alloy), heat-resisting alloys, etc. are preferred as the metallic materials.

Figure 1B:
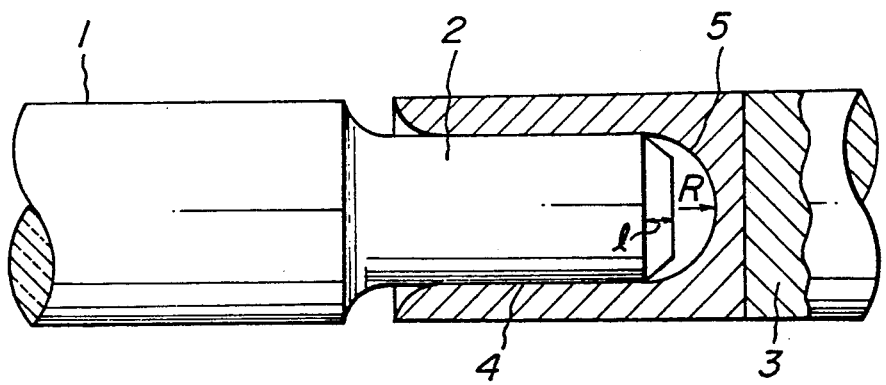

FIG. 1(B) is a sectional view of another embodiment of the ceramic-metal joined composite body according to the present invention. In this embodiment, R/D is 0.5, that is, the bottom of the recess has a semicircular section.

In general, the greater the R value, the better the stress-mitigating effect exhibited in the body. The effect is the greatest in the case of $R/D = 0.5$. However, as R/D approaches 0.5, rounding of the bottom corner of the recess becomes more difficult. Depending upon the working way, the smaller the R, the easier the working.

The R and D values are generally controlled during cutting.

For example, the recess is formed in the metallic member as follows:

First, a hole is formed in a metallic member at a given depth by means of a drill having the outer diameter corresponding to the inner diameter of the intended recess. The shape of the bottom of the thus formed hole is a V shape. If the metallic member is hard or the inner diameter of the recess is large thus making boring a final hole difficult, a small hole is first formed by a drill having an outer diameter smaller than the inner diameter of the recess by a few millimeters, and then the hole is worked to the intended inner diameter by a cutting tool.

Next the inner peripheral surface and the bottom surface of the hole are ground by using a #120 WA (defined in JIS R 6111) grinding tool with a tip having an outer peripheral portion of an intended R-shape, thereby forming the R at the corner of the bottom.

When R/D is 0.5, the grinding is effected by a ball end mill. To appropriately decide how much R/D is depends upon various factors in designing and economy. When the outer diameter of the projection is up to about 15 mm, R/D is preferably 0.04 to 0.20. As the R/D increases, the time required for boring the hole in the metallic member generally becomes longer.

In the following, actual examples of the present invention will be explained.

EXAMPLE 1

Each of ceramic-metal joined composite bodies partially sectionally shown in FIG. 1 was prepared, in which a projection 2 of the ceramic member 1 made of $Si_3N_4$ was joined to a recess 4 of an intermediate member made of an Fe-Ni alloy. The intermediate member was friction pressure welded to an end of a metallic member 3 made of SNCM 439 (defined in JIS G 4103). The outer diameter of the projections and the inner diameter of the recesses were varied as shown in Table 1. In the above joined composite bodies, the radius of curvature R, at the corner of the bottom 5 of the recess 4 was varied while the width of a frusto-conical end portion of the projection of the ceramic member, "l", was kept constant. Bending fatigue tests were carried out at 9,000 rpm while a load was applied to a portion A in FIG. 1 to give a moment of 0.8 kgm. Results are shown in Table 1.

TABLE 1

| Outer diameter of projection D | Intermediate member inner diameter | Intermediate member outer diameter | R/D | Results |
| --- | --- | --- | --- | --- |
| 8 | 7.95 | 11.4 | 0.03 | Metallic member was factured from the corner of the bottom of the recess at $7.8 \times 10^5$ cycles. |
| 8 | 7.95 | 11.4 | 0.04 | No abnormality was observed at $1.0 \times 10^7$ cycles. |
| 8 | 7.95 | 11.4 | 0.06 | No abnormality was observed at $1.0 \times 10^7$ cycles. |
| 8 | 7.95 | 11.4 | 0.08 | No abnormality was observed at $1.0 \times 10^7$ cycles. |
| 8 | 7.95 | 11.4 | 0.2 | No abnormality was observed at $1.0 \times 10^7$ cycles. |
| 8 | 7.95 | 11.4 | 0.3 | No abnormality was observed at $1.0 \times 10^7$ cycles. |
| 8 | 7.95 | 11.4 | 0.5 | No abnormality was observed at $1.0 \times 10^7$ cycles. |
| 10 | 9.93 | 14.3 | 0.03 | Metallic member was factured from the corner of the bottom of the recess at $1.8 \times 10^6$ cycles. |
| 10 | 9.93 | 14.3 | 0.04 | No abnormality was observed at $1.0 \times 10^7$ cycles. |
| 10 | 9.93 | 14.3 | 0.07 | No abnormality was observed at $1.0 \times 10^7$ cycles. |
| 10 | 9.93 | 14.3 | 0.10 | No abnormality was observed at $1.0 \times 10^7$ cycles. |
| 10 | 9.93 | 14.3 | 0.2 | No abnormality was observed at $1.0 \times 10^7$ cycles. |
| 10 | 9.93 | 14.3 | 0.3 | No abnormality was observed at $1.0 \times 10^7$ cycles. |
| 10 | 9.93 | 14.3 | 0.5 | No abnormality was observed at $1.0 \times 10^7$ cycles. |
| 12 | 11.92 | 17.2 | 0.03 | Metallic member was factured from the corner of the bottom of the recess at $2.6 \times 10^6$ cycles. |
| 12 | 11.92 | 17.2 | 0.04 | No abnormality was observed at $1.0 \times 10^7$ cycles. |
| 12 | 11.92 | 17.2 | 0.06 | No abnormality was observed at $1.0 \times 10^7$ cycles. |
| 12 | 11.92 | 17.2 | 0.10 | No abnormality was observed at $1.0 \times 10^7$ cycles. |
| 12 | 11.92 | 17.2 | 0.2 | No abnormality was observed at $1.0 \times 10^7$ cycles. |
| 12 | 11.92 | 17.2 | 0.3 | No abnormality was observed at $1.0 \times 10^7$ cycles. |
| 12 | 11.92 | 17.2 | 0.5 | No abnormality was observed at $1.0 \times 10^7$ cycles. |
| 14 | 13.91 | 20.0 | 0.03 | Metallic member was factured from the corner of the bottom of the recess at $2.3 \times 10^6$ cycles. |
| 14 | 13.91 | 20.0 | 0.04 | No abnormality was observed at $1.0 \times 10^7$ cycles. |
| 14 | 13.91 | 20.0 | 0.05 | No abnormality was observed at $1.0 \times 10^7$ cycles. |
| 14 | 13.91 | 20.0 | 0.07 | No abnormality was observed at $1.0 \times 10^7$ cycles. |
| 14 | 13.91 | 20.0 | 0.10 | No abnormality was observed at $1.0 \times 10^7$ cycles. |
| 14 | 13.91 | 20.0 | 0.2 | No abnormality was observed at $1.0 \times 10^7$ cycles. |
| 14 | 13.91 | 20.0 | 0.3 | No abnormality was observed at |

TABLE 1-continued

| Outer diameter of projection D | Intermediate member | | R/D | Results |
| --- | --- | --- | --- | --- |
| | inner diameter | outer diameter | | |
| 14 | 13.91 | 20.0 | 0.5 | $1.0 \times 10^7$ cycles. No abnormality was observed at $1.0 \times 10^7$ cycles. |

It is seen from the results in Table 1 that excellent effects can be obtained when the rounded dimension R of the corner of the bottom of the recess of the metallic member falls in $R/D \geq 0.04$. The time required for boring the hole was 6 minutes when R/D-0.05, and 10 minutes when $R/D=0.5$. That is, as R/D increases, the boring time becomes longer.

EXAMPLE 2

Each of ceramic turbocharger rotors 11 partially sectionally shown in FIG. 2 was prepared, in which a projection 12 of the ceramic rotor 11 made of $Si_3N_4$ was joined to a recess provided in an intermediate member 14 made of an Fe-Ni alloy. The intermediate member 14 was friction pressure welded to one end of a metallic shaft 13 made of SNCM 439. In Example 2, the 10 mm outer diameter projection 12 of the ceramic rotor 11 was press fitted to the recess of the intermediate member 14. The inner and outer diameters of the intermediate member recess before the press fitting were 9.93 mm and 14.9 mm, respectively. R/D was set at 0.05. After the press fitting, the joined composite body was thermally treated.

The ceramic turbocharger rotor was assembled in a high temperature rotary tester, and was rotated at a circumferential speed of 500 m/sec in combustion gases at 900° C. for 100 hours. As a result, no abnormality was observed.

The present invention is not limited to the above-mentioned examples, and various modifications, variations and changes of the same could be made. For instance, although the peripheral wall of the recess of the metallic member is constituted by a one stage straight portion in the above examples, the present invention is also favorably applicable to a case where a two stage peripheral wall, that is, the peripheral wall of the recess is constituted by two stages of a greater diameter portion and a smaller diameter portion. Further, although only the ceramic turbocharger rotors were illustrated in the above examples, it goes without saying that the present invention is favorably applicable to other rotary members, such as gas turbine rotors for example.

As is clear from the foregoing explanation, according to the present invention, the bending fatigue resistance under rotation of the ceramic-metal joined composite body can be enhanced by setting the R of the corner of the bottom of the recess of the metallic member at not less than 0.04 time the outer diameter D of the projection of the ceramic member. Thereby, fracture of the joined composite body can be prevented effectively. Thus, ceramic-metal joined composite bodies having high reliability can be obtained.

What is claimed is:
1. A ceramic-metal joined composite body comprising:
    a ceramic member having a projection formed thereon, said projection being substantially cylindrical and having a diameter D;
    a solid metallic member having a recess formed therein, said recess being defined by a substantially cylindrical inner surface, a bottom surface, and a curved surface between said inner surface and said bottom surface, said curved surface having a radius of curvature R;
    wherein said projection of said ceramic member is fitted into said recess of said metallic member and R/D is 0.04 to 0.20; wherein said composite body is capable of repeated high speed rotation about the center line axis of said cylindrical projection, said axis being perpendicular to said diameter.
2. The ceramic-metal joined composite body of claim 1, wherein said projection is fitted into said recess by a technique selected from the group consisting of press fitting, shrinkage fitting, expansion fitting and combinations thereof.
3. The ceramic-metal joined composite body of claim 1, wherein said body is a rotary shaft for a turbocharger rotor.
4. The ceramic-metal joined composite body of claim 1, wherein said body is a gas turbine rotor.
5. The ceramic-metal joined composite body of claim 2, wherein said body is a rotary shaft for a turbocharger rotor.
6. The ceramic-metal joined composite body of claim 2, wherein said body is a gas turbine rotor.

* * * * *